US011842113B2

(12) United States Patent
Takagi

(10) Patent No.: US 11,842,113 B2
(45) Date of Patent: Dec. 12, 2023

(54) SYSTEM, IMAGE FORMING APPARATUS, CONTROL METHOD, AND STORAGE MEDIUM

(71) Applicant: CANON KABUSHIKI KAISHA, Tokyo (JP)

(72) Inventor: Noriko Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/149,376

(22) Filed: Jan. 3, 2023

(65) Prior Publication Data

US 2023/0221907 A1 Jul. 13, 2023

(30) Foreign Application Priority Data

Jan. 11, 2022 (JP) .................. 2022-002229

(51) Int. Cl.
*G06F 3/12* (2006.01)
(52) U.S. Cl.
CPC .......... *G06F 3/1273* (2013.01); *G06F 3/1203* (2013.01); *G06F 3/1286* (2013.01)
(58) Field of Classification Search
CPC ...... G06F 3/1273; G06F 3/1203; G06F 21/00; H04N 1/00838; H04N 1/00854
USPC .................... 358/1.15; 726/21, 28
See application file for complete search history.

(56) References Cited

U.S. PATENT DOCUMENTS

2008/0018931 A1\* 1/2008 Tanaka .................. G06F 3/1204
358/1.15

FOREIGN PATENT DOCUMENTS

JP 2013055605 A 3/2013

\* cited by examiner

*Primary Examiner* — Jamares Q Washington
(74) *Attorney, Agent, or Firm* — Canon U.S.A., Inc. IP Division

(57) ABSTRACT

An image forming apparatus transmits job histories that satisfy monitoring conditions to a storage service and stores job histories that do not satisfy the conditions in an information processing apparatus. When a job execution user is added to the monitoring conditions, the job history information corresponding to the added job execution user among the job histories stored in the information processing apparatus is transmitted to the storage service. The storage service manages the job history that satisfies the monitoring condition received from the image forming apparatus and notifies the administrator. When the job history information that does not meet the monitoring conditions is received, the information is notified to the administrator.

9 Claims, 14 Drawing Sheets

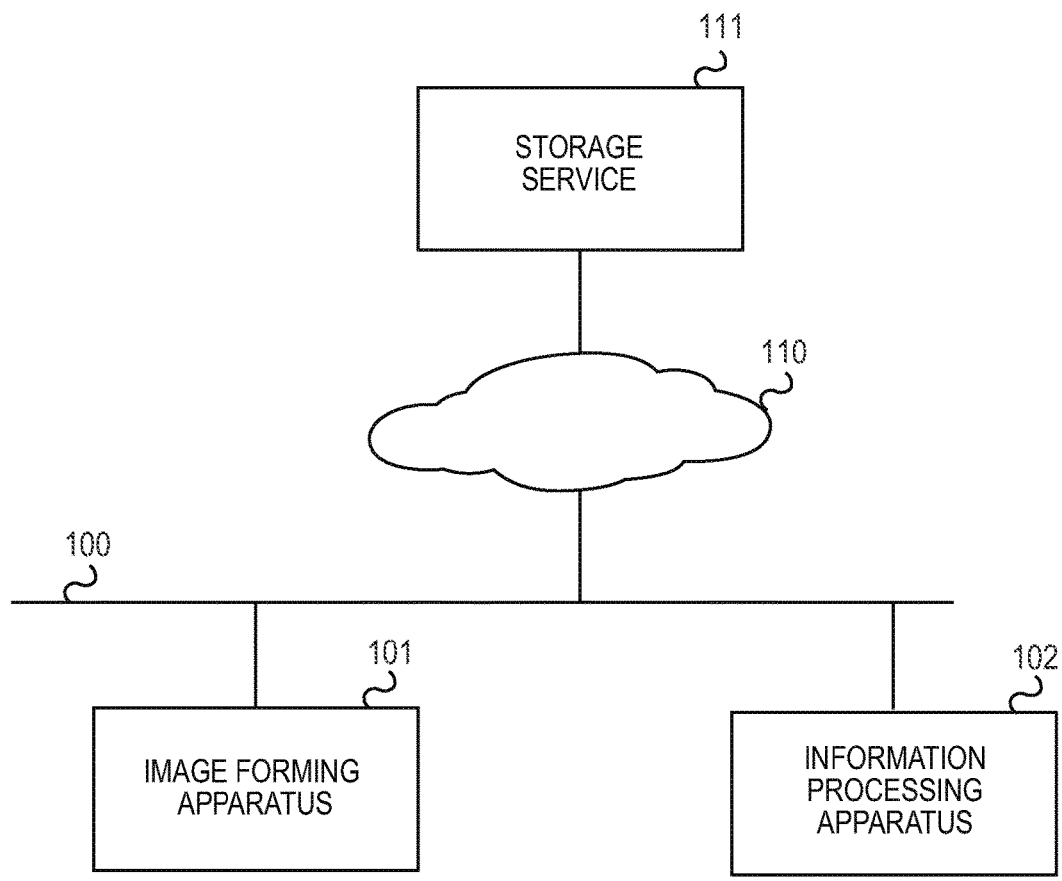
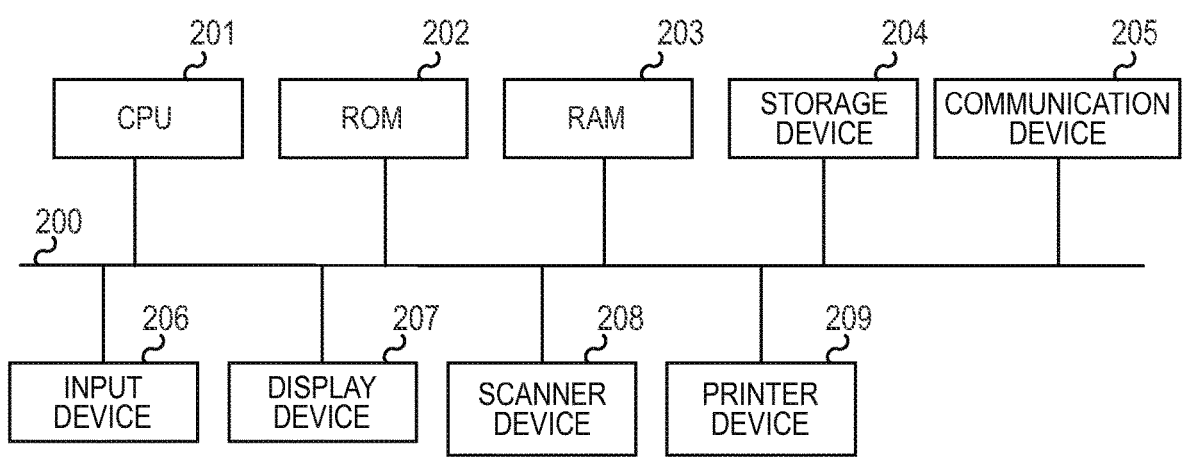

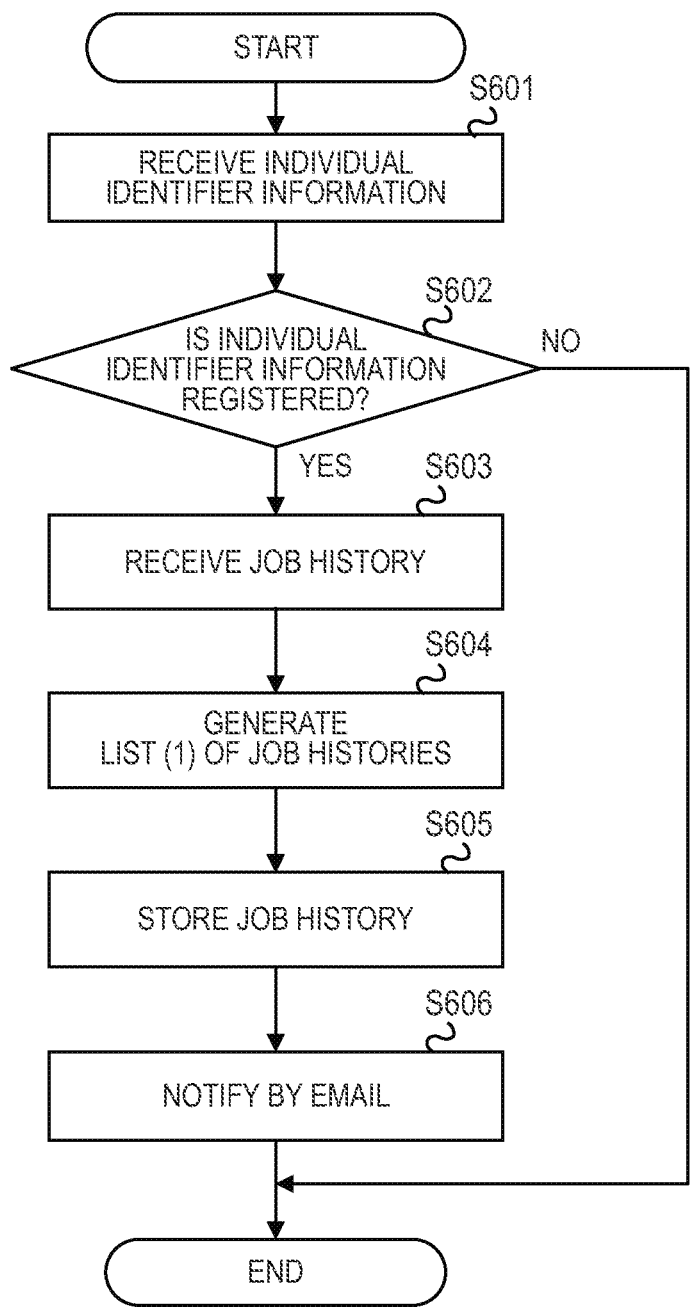

701 FILTERING CONDITION
SPECIFY FILTERING CONDITION FOR IMAGE LOGS TO BE TRANSMIT TO STORAGE SERVICE

702 JOB TYPE :
☐ COPY
☒ PRINT
☒ FAX
☐ SCAN

703 KEYWORDS :
CONFIDENTIAL
SPECIFICATION

704 USERS :
UserA
UserB
UserX
UserY

705 ADD

706 EMAIL SETTINGS
SMTP SERVER : smtp.server.co.jp
PORT : 25
SMTP AUTHENTICATION : ACCOUNT : Mail-user@mail.com
PASSWORD : ••••••••
EMAIL NOTIFICATION ADDRESS : abc@mail.com
def@mail.com

707 CANCEL    708 OK

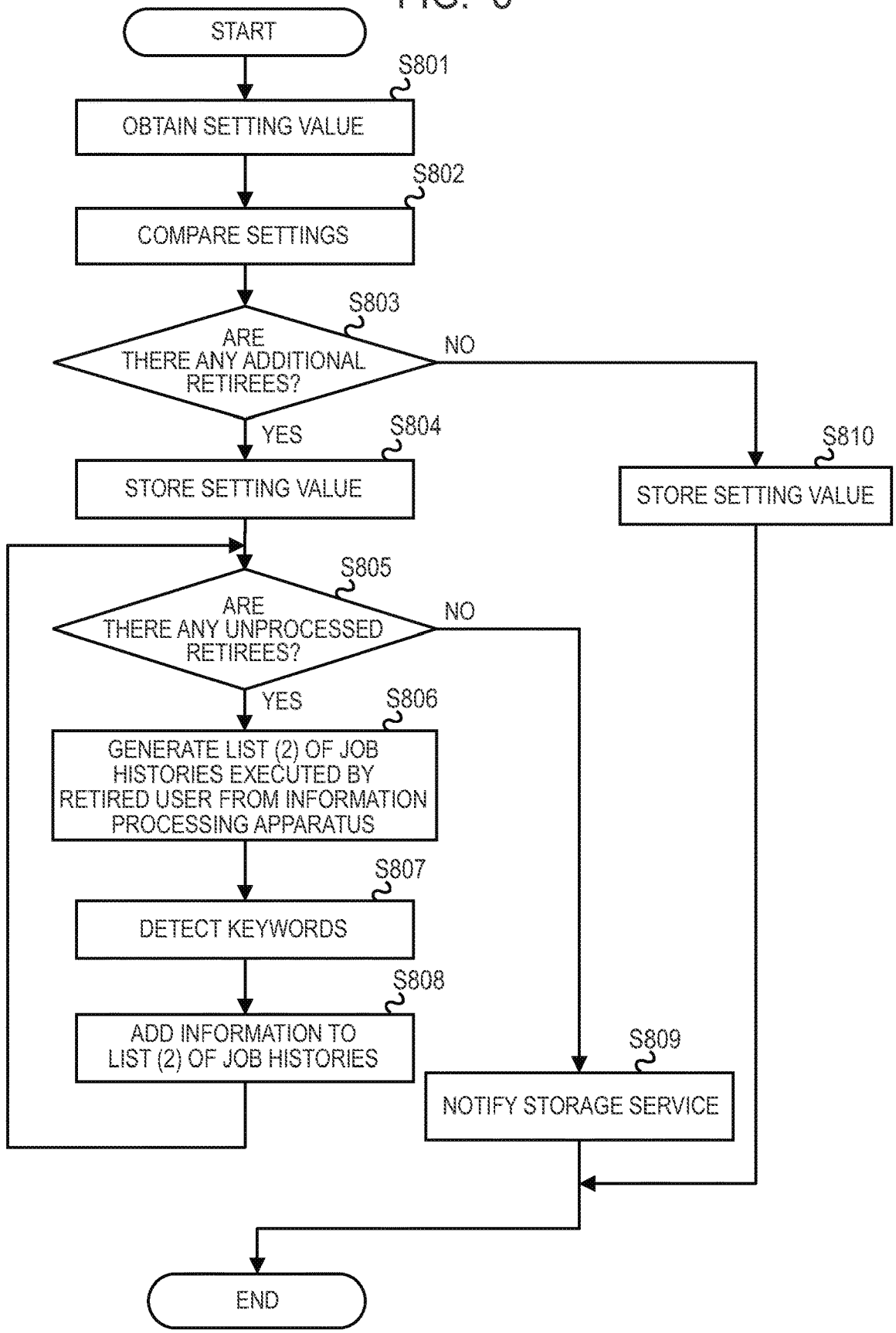

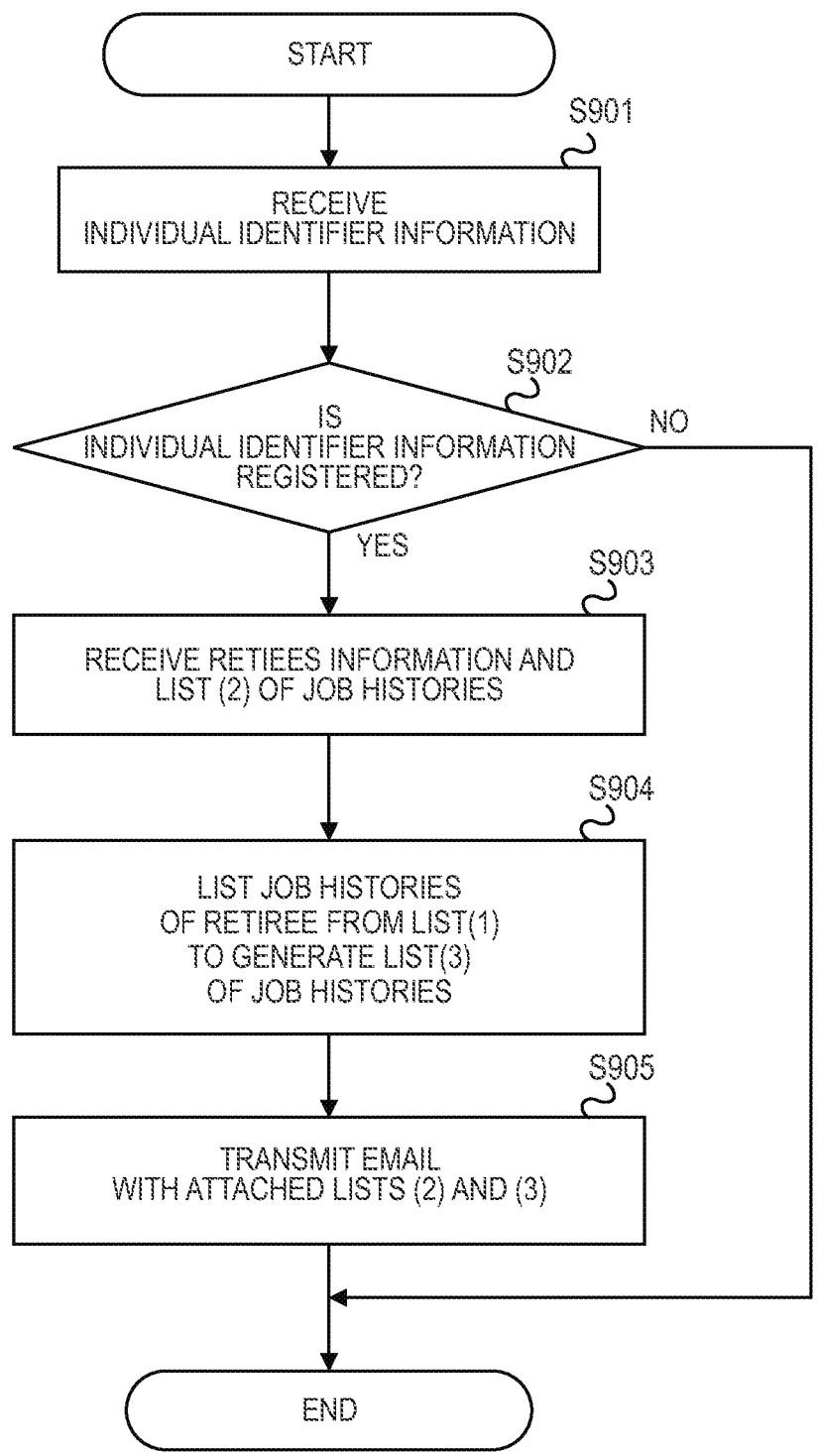

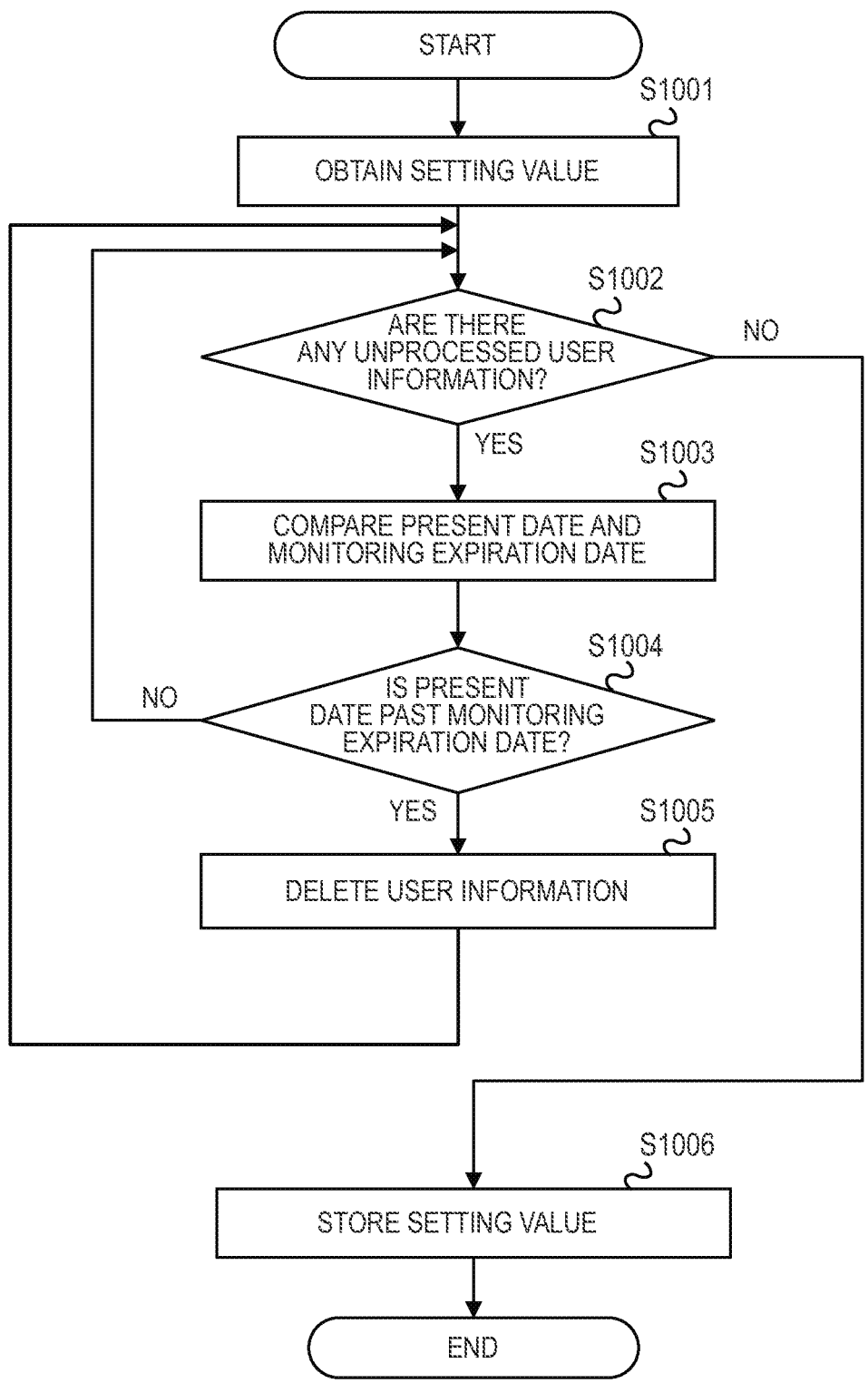

SYSTEM, IMAGE FORMING APPARATUS, CONTROL METHOD, AND STORAGE MEDIUM

BACKGROUND OF THE DISCLOSURE

Field of the Disclosure

The present disclosure relates to a system, an image forming apparatus, a control method, and a storage medium.

Description of the Related Art

There is a job history monitoring system including an image forming apparatus such as a multifunction peripheral device and a storage server. The image forming apparatus executes jobs such as printing, scanning, faxing, and copying, and generates job histories for the executed jobs and transmits the job histories to the storage server. The storage server receives and stores the job histories from the image forming apparatus and also provides a search function.

For example, the job history includes information on when the job is executed, such as a user executing the job, execution date and time, device information, document name, and type of the executed job. The document used for the job may also be included in the job history as image data. Monitoring users, such as administrators, use the search function provided by the storage server to monitor and audit whether there are any general users who have executed jobs illegally.

In recent years, telework (telecommuting, mobile work, satellite office work) has become widespread, and it is desirable that the monitoring and auditing performed by the aforementioned monitoring users can also be performed in a telework environment. One method to achieve this is to configure the storage server of the job history monitoring system in the cloud. Hereafter, the storage server configured in the cloud will be referred to as a "storage service".

However, in the cloud configuration, running costs are proportional to the amount of communication data and the number of image forming apparatuses to be monitored. In particular, when the job history includes image data, the amount of communication data increases, which raises communication costs, and the data size of the job history to be stored increases, which requires large-capacity storage, which raises running costs. In general, in many cases, the running costs of the cloud system may be higher than the system running costs within an intranet when the configuration requires a large amount of communication data and large storage capacity.

One method to avoid such an increase in running costs is to limit and filter the job histories transmitted from the image forming apparatus to the storage service so that only job histories satisfying certain conditions are transmitted. In this case, the job histories that are not transmitted to the storage service to reduce costs are generally not stored (deleted) in the system as unnecessary job histories. This method can reduce the amount of communication data between the image forming apparatus and the cloud and the number of job histories to be stored, thereby reducing costs.

Japanese Patent Application Laid-Open No. 2013-55605 proposes a technique for flexibly setting a period for storing the job histories according to job attributes such as job type, job settings, and job security level. Thus, it is possible to properly manage the period for storing the job histories to reduce costs.

In order to reduce the costs of the amount of communication data between the image forming apparatus and the cloud, for example, the image forming apparatus may transmit the job histories satisfying the following conditions to the storage service.

i) A job history with job execution date and time outside business hours.
ii) All job histories executed by a specific user.

It is possible to monitor the job histories executed outside of business hours when there are fewer workers in an office, and with respect to the specific user, it is possible to monitor all job histories executed by the specific user. Thus, while reducing costs, risks of unauthorized job execution by general users can also be reduced.

As in the example above, in a case where the image forming apparatus transmits only job histories satisfying specific conditions to the storage service to reduce costs and avoid the risks of unauthorized job execution by the general users, the amount of communication data may be reduced but the job histories are not stored during business hours. Therefore, it is not possible to detect not all unauthorized jobs.

As a specific example, if an employee who will leave the company unauthorizedly prints and takes confidential company information during business hours and then informs the company of his/her intention to leave, the administrators cannot detect the employee's (retiree's) unauthorized printing. In other words, the administrator who has not been informed of the retirement in advance cannot add the retiree to the aforementioned condition of "all job histories for a specific user who executes jobs", and as a result, the retiree may be omitted from the monitoring process without obtaining job histories.

As another specific example, if there are new contract employees who intend to take out confidential information or new employees who do not understand the distinction between public and private matters, it is necessary to monitor whether or not the employees are unauthorized printing during business hours. In this case, it is possible to monitor according to the aforementioned condition of "all job histories executed by the specific user". However, if the aforementioned condition is not removed after a certain period, the amount of communication data to the storage service will no longer be reduced. Therefore, for example, once a month, it is necessary to review the conditions of contract employees and new employees who have been working for a certain period since the employees started working, to ensure whether or not the employees are not included in the conditions, which requires a lot of time and effort regarding the review of the conditions.

SUMMARY OF THE DISCLOSURE

Embodiments of the present disclosure are directed to solve the above issues. The purpose of embodiments of the present disclosure is to provide a scheme to both reduce running costs by limiting the number of jobs to be monitored and to reduce risks by minimizing monitoring omissions.

According to embodiments of the present disclosure, a system, comprising one or more image forming apparatuses, for providing a service managing information of a job performed by the one or more image forming apparatuses, each of the one or more image forming apparatuses comprises: one or more memories; and one or more processors that execute instructions to: generate the information of the job as a job history in response to performing the job; set conditions including information of a user performing the job as conditions for the job to transmit the job history to the service; first transmit a first job history that satisfies the conditions, from among a plurality of the job histories, to the service; store a second job history that does not satisfy the conditions, from among the plurality of the job histories, in a predetermined storage medium; and obtain a third job history corresponding to the job performed by the user among the plurality of the second job histories and second transmit information of the third job history to the service when the information of the user performing the job is added to the conditions, wherein the service comprises: one or more memories; and one or more processors that execute instructions to: manage the job history received from the one or more image forming apparatuses; first notify a predetermined notification destination based on the job history received from the one or more image forming apparatuses; and second notify the predetermined notification destination based on information of the job history received from the one or more image forming apparatuses.

Further features of the present disclosure will become apparent from the following description of exemplary embodiments with reference to the attached drawings.

BRIEF DESCRIPTION OF THE DRAWINGS

FIG. 1 illustrates a diagram showing the overall configuration of a system.

FIG. 2 illustrates a diagram showing a hardware configuration of the devices included in the system according to the present embodiment.

FIG. 6 illustrates a flowchart showing job history receiving process of the storage service according to the first embodiment.

FIG. 7A illustrates a diagram showing a settings screen provided by the storage service according to the present embodiment.

FIG. 8 illustrates a flowchart showing setting value obtaining process of the image forming apparatus according to the first embodiment.

FIG. 9 illustrates a flowchart showing the notification process for a job history list of the retiree by the storage service according to the present embodiment.

FIG. 10 illustrates a flowchart showing the process of automatically deleting accounts from the set values by the storage service according to the present embodiment.

DESCRIPTION OF THE EMBODIMENTS

Figure 3:
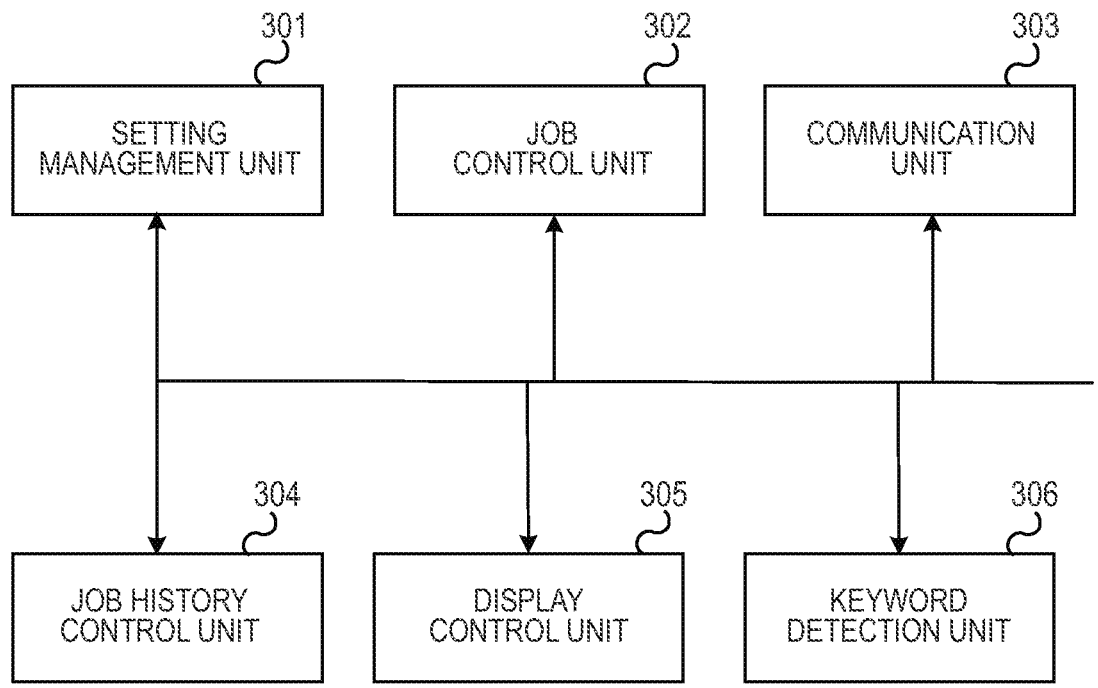
FIG. 3 illustrates a diagram showing a software configuration of the image forming apparatus according to the first embodiment.

Hereinafter, embodiments of the present disclosure will be described with reference to the drawings.

First Embodiment

FIG. 1 illustrates a diagram showing the overall configuration of a system according to the present embodiment in the present disclosure. The system stores job histories, such as image logs, for jobs executed on an image forming apparatus in a storage service on the cloud.

A network 100 is a LAN such as an in-house network (intranet). An image forming apparatus 101 and an information processing apparatus 102 are connected to the network 100. A network 110 is the Internet. A storage service 111 is connected to the network 110.

Although each apparatus is described here one by one, a plurality of apparatuses may be connected to the network 100 and the network 110. The image forming apparatus 101 and the information processing apparatus 102 may be configured on the same apparatus.

The image forming apparatus 101 has functions such as scanning, printing, copying, faxing, and transmitting, and executes jobs by operations from users. It also has a job history storing function that generates the job histories after or in parallel with job execution and stores the job histories in a storage device.

Further, the image forming apparatus 101 has functions of storing the stored job histories in the storage device of the information processing apparatus 102 and transmitting the stored job histories to the storage service 111 according to pre-specified filter conditions. Furthermore, the image forming apparatus 101 may perform image processing such as OCR (optical character recognition) processing and keyword detection on the image data of the job histories. To realize these functions, the image forming apparatus may be a multi-function peripheral (MFP).

The information processing apparatus 102 provides the storage device for the image forming apparatus 101 to store the job histories. It is desirable that the storage device be configured to ensure security, such as requiring authentication to access the stored job histories. In the present embodiment, the information processing apparatus 102 is described as a separate chassis from the image forming apparatus 101, but the information processing apparatus 102 may be part of the same chassis of the image forming apparatus 101.

The storage service 111 receives the job histories from the image forming apparatus 101 to store the job histories in a storage device such as a database, or in a predetermined folder. The database may be built on the storage service 111 or an external storage service not shown may be used. Here, the storage service 111 may perform image processing such as OCR processing and keyword detection on the image data of the job histories received from the image forming apparatus 101.

FIG. 2 illustrates a block diagram showing an example of the hardware configuration of the image forming apparatus 101, the information processing apparatus 102, and the storage service 111. General hardware configuration of an information processing apparatus can be applied to the present embodiment personal computer (PC) and image forming apparatus.

A CPU 201 comprehensively controls the whole of each piece of hardware and controls each unit connected to a bus 200 to execute each function such as printing and scanning. A ROM 202 is a data read only memory and stores the basic control program of, for example, an image forming apparatus. A RAM 203 is a memory that can read/write data, and is used as a working memory for the CPU 201, for example.

A storage device 204 is used as a storage area for temporary data while each program is running and for permanent data. For example, the storage device 204 is often an HDD, but may be a device with an SSD, or an external media such as a CD, DVD, or memory card that can be loaded to read/write data.

A communication device 205 connects the image forming apparatus 101, the information processing apparatus 102, and the storage service 111 to a LAN or the Internet, and enables data communication between apparatus via TCP/IP or the like.

An input device 206 is an operation unit for receiving input operations of characters and data by the users. The input device 206 is, for example, a keyboard, mouse, hard key, or touch panel. A display device 207 is a device for displaying various screens, such as a liquid crystal display or a touch panel. On a user interface screen displayed on the display device 207, the users input an instruction via the input device 206 to operate job execution instructions to the image forming apparatus 101 or setting instructions to the storage service 111.

The image forming apparatus 101 is connected to a scanner device 208 and a printer device 209 via the bus 200. The storage service 111 may be realized by one computer or a plurality of computers, or may be configured to be realized using cloud computing technique.

FIG. 3 illustrates a diagram showing an example of the software configuration of the image forming apparatus 101 in the first embodiment. The software configuration shown in FIG. 3 is realized if the CPU 201 reads a program stored in, for example, the ROM 202 into the RAM 203 and executes the program.

A setting management unit 301 stores settings related to the execution of various functions of the image forming apparatus 101 in each storage device such as the RAM 203 and the storage device 204, and reads the settings from each storage device. Here, the setting includes, for example, copy settings for executing copy functions, print settings for executing print functions, network settings, and individual identification information. Further, the foregoing setting may include setting for whether or not to generate job histories when jobs are executed, and transmission destination information and storage destination information of the generated job histories. Furthermore, the foregoing setting may include filter conditions such as user information and monitoring deadlines pre-specified by the administrator and keywords used in the keyword detection process.

Based on a job execution request input by the input device 206 or received by a communication unit 303, a job control unit 302 controls the scanner device 208 and the printer device 209 to execute various jobs. For example, in the case of retaining a print job on the apparatus, the print job received by the communication unit 303 from an information processing apparatus 102 or a print client PC (not shown) is temporarily retained in the storage device 204. Then, the print job stored in the job control unit 302 is printed in response to user instructions via the input device 206 of the image forming apparatus 101.

The communication unit 303 receives, for example, the print job and the job execution request from the information processing apparatus 102 or the print client PC (not shown). Further, the communication unit 303 transmits the job histories to the storage service 111 and stores the job histories in the information processing apparatus 102.

When the job is executed in the job control unit 302, a job history control unit 304 generates a job history after or in parallel with the job execution and stores the job history in the storage device 204. The job history generated by the job history control unit 304 includes, for example, as information when a job is executed, the job execution user, execution date and time, device information, document name, type of job executed, and the like. The job history may also include documents used in the job as image data.

A display control unit 305 displays a screen on a display device 207 and receives instructions from the user via the input device 206. A keyword detection unit 306 detects whether specific keywords for the job history generated and stored by the job history control unit 304 are included. The keywords are pre-specified by the user via the display control unit 305. The keyword detection unit 306 confirms whether the keywords are included in job information such as a job execution user and a document name. The keyword detection unit 306 performs OCR processing on the image data included in the job histories and confirms whether the keyword is included in the OCR characters information obtained as a result of the OCR processing.

Figure 4:
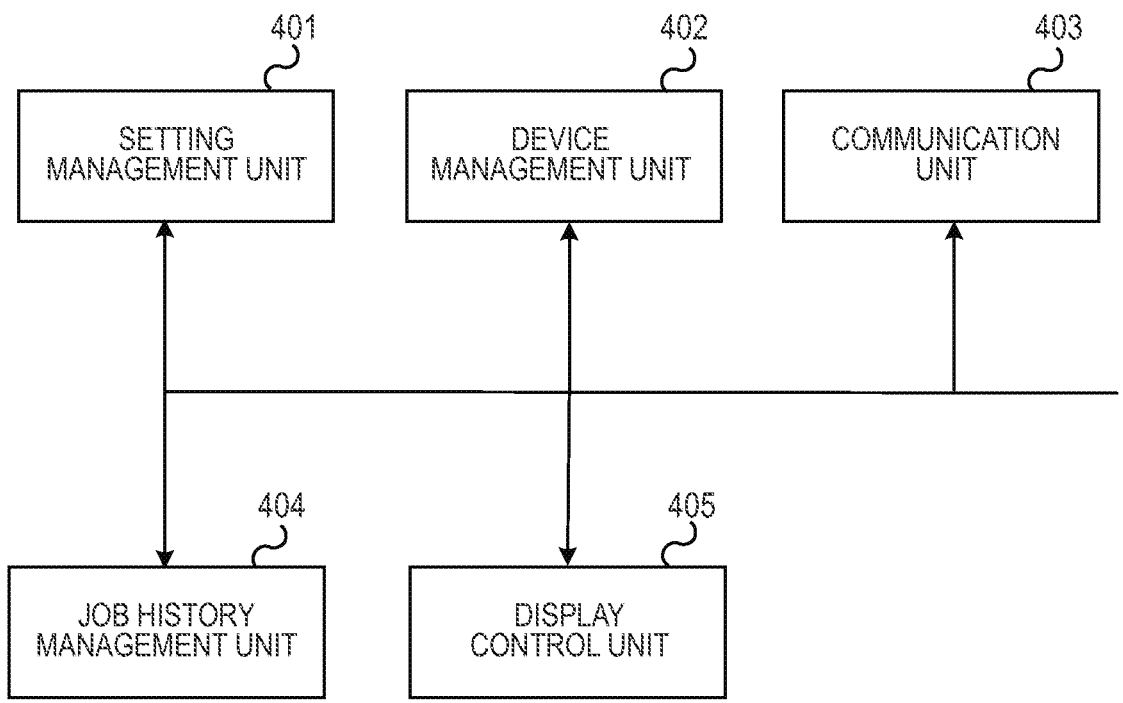
FIG. 4 illustrates a diagram illustrating a software configuration of the storage service according to the first embodiment.

FIG. 4 illustrates an example showing the software configuration of the storage service 111 in the first embodiment. The software configuration shown in FIG. 4 is realized if the CPU 201 reads a program stored in, for example, the storage device 204 into the RAM 203 and executes the program.

A setting management unit 401 stores various setting values of the image forming apparatus 101 and the storage service 111 in the storage device 204, and reads the setting values as necessary. The setting values of the image forming apparatus 101 include, for example, operation status of the image forming apparatus 101 and the keywords for keyword detection. The setting values of the storage service 111 include, for example, the storage location storing information of the job histories and storage conditions such as image format.

A device management unit 402 manages information on a plurality of image forming apparatus 101. In the present embodiment, the image forming apparatus 101 is registered in the storage service 111 upon system introduction. The communication unit 303 of the image forming apparatus 101 transmits registration information including the individual identification information to the communication unit 403 of the storage service 111. The device management unit 402 of the storage service 111 stores the registration information including individual identification information in the storage device 204. Thus, the storage service 111 can receive the job histories from the image forming apparatus 101 managed by the device management unit 402.

The communication unit 403 receives various requests transmitted from the image forming apparatus 101 and transmits processing results. The communication unit 403 also receives the job histories from the image forming apparatus 101.

A job history management unit 404 stores the job histories received from the image forming apparatus 101 via the communication unit 403 in the storage device 204 of the storage service 111. In response to the user instruction via the input device 206 or the like on a search screen or the like (not shown), the job history management unit 404 reads the requested job histories from the storage device 204 and displays the requested job histories on the display device 207 and the like. A screen control unit 405 displays a screen on the display device 207 and the like and receives instructions from the user via the input device 206 and the like.

The screen control unit 405 has the function of a web server and can display a screen on the web browser and receive instructions from the user via the web browser according to access from the web browser running on the PC operated by the user. That is, the screen control unit 405 can display the above search screen and the like on the web browser, receive the user instructions via the web browser, and display the job histories read from the storage device 204 on the web browser.

Figure 5:
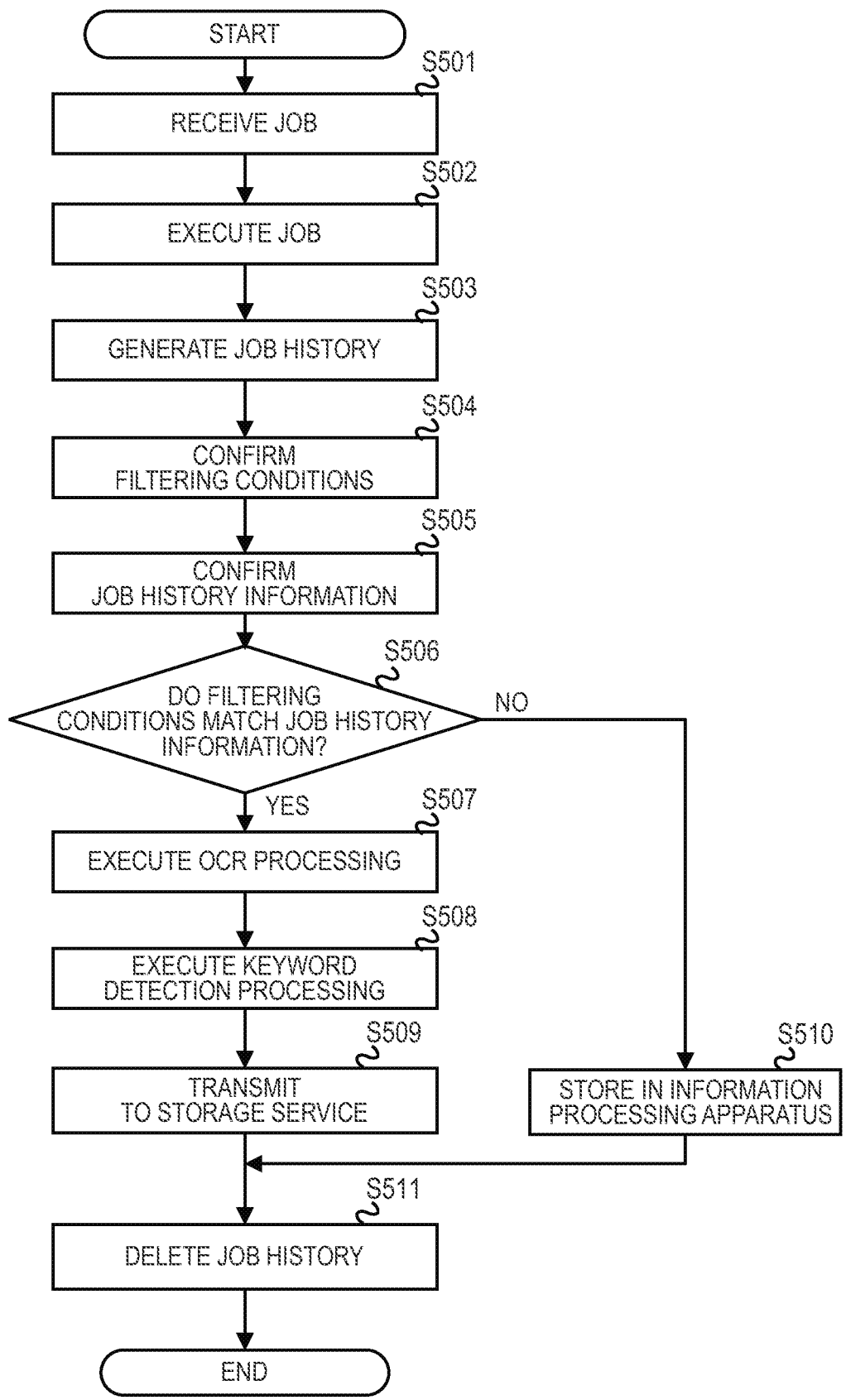
FIG. 5 illustrates a flowchart showing job execution process of the image forming apparatus according to the first embodiment.

FIG. 5 illustrates a flowchart showing an example of processing when the job control unit 302 of the image forming apparatus 101 executes the jobs. The jobs executed by the job control unit 302 are jobs designated by the user via the display device 207 or the input device 206 and print jobs received from the information processing apparatus 102 or the print client PC (not shown) via the communication unit 303.

In step S501, the job control unit 302 receives the job execution instruction from the user via the display device 207 or the input device 206. Or the job control unit 302 receives a job from the information processing apparatus 102 or the print client PC (not shown) via the communication unit 303. In response to receiving such a job, the job control unit 302 advances the process to step S502. In step S502, the job control unit 302 executes the job received in step S501.

In step S503, the job history control unit 304 generates a job history of the job after or in parallel with the job execution in step S502 to store the generated job history in the storage device 204.

In step S504, the job history control unit 304 confirms the setting information and obtains filtering conditions via the setting management unit 301. Here, the filtering conditions are the conditions for transmitting the job histories to the storage service 111, such as job types, keywords, and users shown in FIG. 7A below. For example, in the setting screen shown in FIG. 7A, "PRINT" and "FAX" are specified as job types of the filtering conditions. Further, "confidential" and "specification" are specified as keywords of the filtering conditions, and "userA", "userB", "userX", and "userY" are specified as users of the filtering conditions.

In step S505, the job history control unit 304 confirms the job history information generated in step S503. Here, the job history information to be confirmed includes items (for example, information about the executed job types and the user executing the job) that satisfy the filtering conditions.

In step S506, the job history control unit 304 compares the filtering conditions obtained in step S504 with the job history information confirmed in step S505 to determine whether or not the filtering conditions match the job history information. For example, if "the executed job type" in the job history is "PRINT", it is determined that the filtering condition is met. On the other hand, if "the executed job type" in the job history is "SCAN", it is determined that the filtering condition is not met. If the user executing the job in the job history is "UserX", the filtering condition is met. For example, if "the executed job type" in the job history is "SCAN" (i.e., the job types of the filtering condition is not met) and the user executing the job in the job history is "UserX" (i.e., the users of the filtering condition is met), it is determined that the filtering condition is met (i.e., the condition is satisfied).

If the filtering conditions match in the processing of step S506 (YES in step S506), the job history control unit 304 advances the process to step S507. On the other hand, if the filtering conditions do not match in the processing of step S506 (NO in step S506), the job history control unit 304 advances the process to step S510.

In step S507, the job history control unit 304 performs OCR processing on the image data included in the job history stored in the storage device 204 in step S503. The keyword detection unit 306 performs OCR processing based on the request to the keyword detection unit 306 from the job history control unit 304. Since OCR processing is a common technique, a detailed description is omitted. OCR processing includes a process to read character information from images and obtain OCR character information. The present embodiment assumes that the obtained OCR character information will be temporarily stored in the RAM 203 for use in the next process, but the obtained OCR character information may be stored in the storage device 204.

In step S508, the keyword detection unit 306 performs the keyword detection processing on the OCR character information obtained in step S507. The keyword detection processing determines whether or not the pre-specified keywords by the administrator and stored in the setting management unit 301 are included in the OCR character information. For example, if "CONFIDENTIAL" and "SPECIFICATION" are specified as keywords, the keyword detection unit 306 searches the keywords of "CONFIDENTIAL" and "SPECIFICATION" in the OCR character information. The keywords determined to be included in the OCR character information are temporarily stored in the storage device 204 or RAM 203 of the image forming apparatus 101 for use in the following step S509.

In step S509, the job history control unit 304 transmits the individual identification information of the image forming apparatus 101 and the job history to the storage service 111 via the communication unit 303. At this time, the job history control unit 304 transmits the keywords determined to be included in the OCR character information temporarily stored in the keyword detection processing in step S508, together with the job history. Here, the individual identification information is unique information that can identify an individual, such as a serial number and the like, held by the image forming apparatus 101 in advance. In the present embodiment, the image forming apparatus 101 registers the individual identification information for the storage service 111 in advance and the storage service 111 confirms the individual identification information at the start of the subsequent communication. In this way, the storage service 111 recognizes the image forming apparatus 101 as an authorized apparatus. After the processing in step S509, the job history control unit 304 advances the process to step S511.

In step S510, the job history control unit 304 associates and stores the job history and the OCR character information (not shown but obtained by the same OCR processing as in step S507) in the information processing apparatus 102 via the communication unit 303. Here, it is assumed that by pre-setting shared folders, and the like in the information processing apparatus 102, the job history can be stored using the functions of the information processing apparatus 102. It also authenticates shared folders as needed. For example, a web application may be implemented on the information processing apparatus 102 to transmit the job history via the communication unit 303. A permanent storage area may also be created and stored in the storage device 204 of the image forming apparatus 101 instead of the information processing apparatus 102. After the processing in step S510, the job history control unit 304 advances the process to step S511.

In step S511, the job history control unit 304 deletes the job history stored in the storage device 204 in step S503 if the processing in steps S509 and S510 above is successful. The transmission processing in step S509 and the storage processing in step S510 may be performed according to a scheduled transmission setting (not shown). In this case, the information required in steps S509 or S510 is temporarily stored in storage device 204 or the RAM 203. The job history stored in the above step S510 is periodically deleted by the job history control unit 304 of the image forming apparatus 101. Based on a predetermined period (for example, three months), the deletion process deletes the job histories that have been stored for the predetermined period. In response to changing the date, the job history control unit 304 may perform deletion processing. Since the deletion process is a common technique, a detailed description using drawings is omitted. After the processing in step S511, the job history control unit 304 terminates the processing of the flowchart.

FIG. 6 illustrates a flowchart showing an example of processing in which the storage service 111 receives the job history transmitted with job execution in the image forming apparatus 101 shown in FIG. 5. The processing is executed according to the transmission processing of step S509 shown in FIG. 5.

In step S601, if the communication unit 403 of the storage service 111 obtains (receives) the individual identification information of the image forming apparatus 101 from the communication unit 303 of the image forming apparatus 101, the process proceeds to step S602. In step S602, the communication unit 403 confirms, via the device management unit 402, whether or not the individual identification information received in step S601 is included in the individual identification information of the managed (registered) image forming apparatus. As described in FIG. 4, the image forming apparatus 101 needs to be registered with the storage service 111 before installation. The device management unit 402 confirms whether or not the individual identification information included in the registration information stored in the storage device 204 by the device management unit 402 of the storage service 111 matches the individual identification information received in step S601.

Based on the above confirmation result, the device management unit 402 determines whether or not the image forming apparatus 101 is a managed (registered) image forming apparatus. If the image forming apparatus 101 is registered (YES in step S602), the communication unit 403 advances the process to step S603. On the other hand, if the image forming apparatus 101 is not registered (NO in step S602), the communication unit 403 terminates the processing of the flowchart.

In step S603, the communication unit 403 receives from the image forming apparatus 101 the job history and the keywords determined to be included in the OCR character information. The communication unit 403 temporarily stores the received job history in the storage device 204 or the RAM 203 and passes the received information to the job history management unit 404. In response to the above processing, the job history management unit 404 executes the processing of step S604.

In step S604, the job history management unit 404 generates a job history list (1) based on the job history received in step S603. An example of the job history list (1) is shown in Table 1. The job history list (1) is a list including the job histories received from the image forming apparatus 101 by the storage service 111 and stored in the storage device 204 and the like. In response to receiving the job history from the image forming apparatus 101, the job history management unit 404 adds a new line including the received job history to the job history list (1). The job history list (1) can be stored as a text-based file, such as csv, or in a database. If the job history list (1) is stored in the database, the job history management unit 404 may convert data of the job history list (1) stored in the database into a list format in response to a notification in step S606, which will be described later.

In the example in Table 1, a line of the list includes a serial number, a job type, a user name, a document name, keywords, and a destination included in the job history. The serial number indicates the individual identification of the image forming apparatus 101 executing the job. The job type indicates the type of the executed job, such as printing, scanning, and the like. The user name indicates the name of the user executing the job. The document name indicates the name of the document used for the job. If the job is printing, the document name may be a file name of the document (for example, "material.doc"). If the job is scanning, the document name may be a date and time when the document is scanned (for example, "20200620_150045" corresponding to Jun. 20, 2020, at 15:00:45). The keywords indicate the keywords included in the OCR character information and may enumerate a plurality of the keywords. The destination indicates the storage destination of the image data. The destination may be the URL (for example, "http://storage.com/data/1") which points to the path stored in the storage device 204 of the storage service 111. Note that Table 1 may include other items with unique IDs assigned to each job history and information such as IP addresses, names related to the image forming apparatus 101, and the like.

TABLE 1

| Serial No. | Job type | User name | Document name | Keywords | Destination |
| --- | --- | --- | --- | --- | --- |
| 12345 | print | userA | material.doc | confidential | http://storage.com/data/1 |
| 34567 | scan | userX | 20200620_150045 | specification confidential | http://storage.com/data/2 |
| 34567 | copy | userB | 20200525104523 | specification confidential | http://storage.com/data/3 |

In step S605, the job history management unit 404 stores the job history in the storage device 204 or the database. In step S606, the job history management unit 404 notifies the information of the storage destination (the path information) where the job history is stored in step S605 to the mail address of the administrator and the monitor that is set in advance by e-mail. Here, the contents to be notified by e-mail may be notified on a job history basis or a daily basis by summarizing the job histories stored on a single day.

Although the present embodiment uses e-mail notifications, the notifications may be displayed on the screen via the display device 207 or the web browser. For example, the notifications may be displayed on the screen in response to a predetermined operation by the administrator and the monitor. In this case, keywords may be highlighted.

Figure 7B:
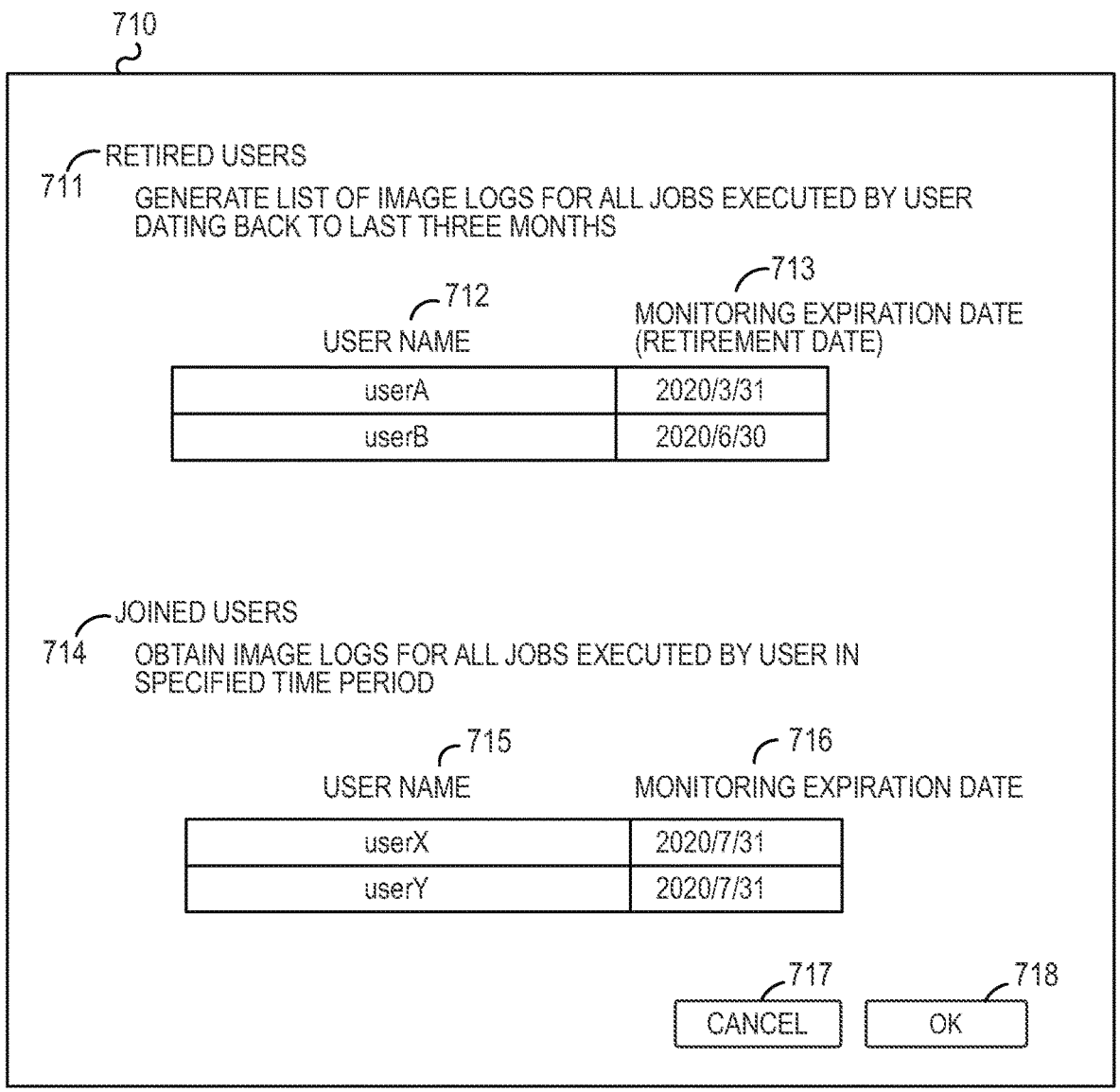
FIG. 7B illustrates a diagram showing a settings screen provided by the storage service according to the present embodiment.

FIGS. 7A and 7B illustrate an example showing the screen displayed by the screen control unit 405 of the storage service 111. In screen 700 shown in FIG. 7A and the screen 710 shown in FIG. 7B, the setting management unit 401 stores the setting values input by the user via the input device 206 in the storage device 204. Further, the image forming apparatus 101 periodically obtains the specified setting values in step S801 shown in FIG. 8, which will be described later.

In the screen 700 shown in FIG. 7A, the conditions for transmitting the job history to the storage service 111 are specified in filtering condition 701. In the present embodiment, the user can set the job types, the keywords, and the users of the setting items as filtering conditions. In the present embodiment, it is determined that the filtering conditions are satisfied in S506 shown in FIG. 5 if any one of the setting items of the filtering conditions meets the job history information. It may also be determined that the filter conditions are satisfied if a plurality of the setting items meets the job history information.

In job type 702 of the setting item, the user checks a checkbox to specify the job type to be transmitted to the storage service 111. Because "PRINT" and "FAX" are checked, the job histories related to the print job and the fax transmission/reception job are transmitted to the storage service 111 by the processing of step S509 shown in FIG. 5. The job histories related to the unchecked copy job and the scan job are stored in the information processing apparatus 102 by the processing of step S510 shown in FIG. 5.

In keywords 703 of the setting item, the user specifies the keywords to be detected for the OCR character information obtained from the image data of the job histories. The specified keywords are used in the processing of step S508 shown in FIG. 5. In the present embodiment, the job histories including "CONFIDENTIAL" and "SPECIFICATION" in the OCR character information are transmitted to the storage service 111 by the processing in step S509 shown in FIG. 5. The job histories in which a word specified as a keyword is not included in the OCR character information are stored in the information processing apparatus 102 by the processing in step S510 shown in FIG. 5.

In user 704 of the setting item, the user specifies the name of the user executing the job that performs special processing. If the user presses an add button 705, the screen 710 shown in FIG. 7B is displayed and the user can specify and add users to be filtered to the user 704. If the specified user is the job execution user of the job history, the job history is transmitted to the storage service 111 by the processing of step S509 shown in FIG. 5. If the job execution user in the job history does not match the specified user, the job history is stored in the information processing apparatus 102 by the processing in step S510 shown in FIG. 5.

If the user presses the add button 705, the screen 710 shown in FIG. 7B is displayed. In the screen 710 shown in FIG. 7B, the user specifies the accounts of retirees, new contract employees, and new employees and sets the monitoring expiration date. In retired user 711 of the filtering condition, the user specifies an account of the retired user. In the screen 710, the user specifies and adds "userA" and "userB" to a list of user names 712, and their retirement dates are defined as "Mar. 31, 2020" and "Jun. 30, 2020" in a list of monitoring expiration dates 713, respectively. The specified accounts are used for the determination of the filter conditions in step S506 shown in FIG. 5. Further, if the retired user 711 has a newly specified account, it is determined to be YES in step S803 shown in FIG. 8, which will be described later, and processing is performed. In the present embodiment, the past three months of job history from the date specified in the monitoring expiration date 713 are automatically monitored, but the user may specify the monitoring period.

In the joined user 714, the user specifies the accounts of the new contract employee and the new employee. In the screen 710, the user specifies and adds "userX" and "userY" to a list of user names 715, and a predetermined period after the hire date for both users (for example, the date three months after the hire date on April 1) is defined as "Jul. 31, 2020" in a list of the monitoring expiration dates 716. The specified accounts are used for the determination of the filter conditions in step S506 shown in FIG. 5.

If the user presses cancel button 717, the screen control unit 405 discards the setting and displays the screen 700. If the user presses OK button 718, the screen control unit 405 reflects the setting to the screen 700 and displays the screen 700. In the present embodiment, the user specifies the account as identifying information for the user to be filtered. The specified account may be a user name and the like including information identifying a user to be filtered.

The screen 700 shown in FIG. 7A will be described again. In email settings 706, the user specifies the email setting for performing the mail notification in step S606 shown in FIG. 6. The email settings 706 include, for example, an SMTP server and port name, an account and password for SMTP authentication, and the email address of the recipient of the email notification.

If the user presses the cancel button 707, the screen control unit 405 discards the setting and closes the screen 700. If the user presses the OK button 708, the screen control unit 405 stores the specified setting values in the storage device 204 via the setting management unit 401. The stored setting values are used in step S801 shown in FIG. 8, which will be described later.

FIG. 8 illustrates a flowchart showing an example of processing in which the job history control unit 304 of the image forming apparatus 101 obtains the setting values from the setting management unit 401 of the storage service 111 via the communication unit 303. In the present embodiment, the processing of the flowchart is executed periodically (for example, once every five minutes) by the job history control unit 304.

In step S801, the job history control unit 304 transmits the individual identification information of the image forming apparatus 101 via the communication unit 303 and the communication unit 403 of the storage service 111 to request the setting values from the setting management unit 401 of the storage service 111. Thus, the job history control unit 304 obtains the latest set values.

In step S802, the job history control unit 304 compares the setting values stored in the storage device 204 with the latest setting values obtained in step S801 via the setting management unit 301. In step S803, based on the comparison result in step S802 above, the job history control unit 304 confirms whether or not a new account has been added to the account of the retiree as a filter condition to store the newly added retiree account in the RAM 203. If a retiree account is newly added (YES in step S803), the job history control unit 304 advances the process to step S804. In step S804, the job history control unit 304 stores the latest setting values obtained in step S801 in the storage device 204 via the setting management unit 301 and advances the process to step S805.

If a retiree account is not newly added (No in step S803), the job history control unit 304 advances the process to step S811. In step S811, the job history control unit 304 stores the latest set values in the storage device 204 in the same manner as in step S804 and terminates the processing of the flowchart.

In step S805, the job history control unit 304 confirms whether or not any of the retiree accounts stored in the RAM 203 in step S803 remain unprocessed. If there are still unprocessed retirees (YES in step S805), the job history control unit 304 advances the process to step S806.

In step S806, the job history control unit 304 refers to the job history of the information processing apparatus 102 and generates a list of job histories in which the retiree account matches the job execution user of the job history as a job history list (2). At this time, the date and time of job execution may be confirmed to generate the job history list (2) for job histories executed during a certain period (for example, in the past three months from the date and time of execution of this process).

An example of the job history list (2) is shown in Table 2. In the screen shown in FIG. 7B, the monitoring expiration date for the "userB" is "Jun. 30, 2020". Among the job histories stored in the storage device 204 of the information processing apparatus 102, the job histories are listed as three months before the monitoring expiration date. Further, the job history list (2) shown in Table 2 lists the job histories corresponding to the job histories executed by the "userB".

TABLE 2

| Serial No. | Job type | User name | Document name | Keywords | Destination |
|---|---|---|---|---|---|
| 12345 | print | userB | material.doc | | \\PC\data\a |
| 12345 | print | userB | schedule.doc | | \\PC\data\b |
| 12345 | FAX | userB | 20200428_110330 | | \\PC\data\c |

In step S807, the job history control unit 304 obtains OCR character information stored in association with the job history in step S510 shown in FIG. 5 via the keyword detection unit 306. The job history control unit 304 also detects whether or not the keywords specified by the keywords 703 shown in FIG. 7A are included in the obtained OCR character information. The foregoing processing enables keyword detection with the latest keyword settings. If OCR character information can not be obtained in step S807, such as if OCR character information could not be stored due to an error and the like in step S510 shown in FIG. 5, OCR processing may be executed as necessary.

In step S808, if the job history control unit 304 detects keywords in step S807, the job history control unit 304 stores the detected keywords in the job history list (2). Table 3 is Table 2 added the detected keyword. Table 3 includes the detected keyword "Confidential" in the document name "material.doc".

TABLE 3

| Serial No. | Job type | User name | Document name | Keywords | Destination |
|---|---|---|---|---|---|
| 12345 | print | userB | material.doc | Confidential | \\PC\data\a |
| 12345 | print | userB | schedule.doc | | \\PC\data\b |
| 12345 | FAX | userB | 20200428_110330 | | \\PC\data\c |

After the processing in step S808, the job history control unit 304 returns the processing to step S805 and performs the processing for the next unprocessed retired user. If there are no unprocessed retired users (NO in step S805), the job history control unit 304 advances the process to step S809.

In step S809, the job history control unit 304 notifies the storage service 111 of the individual identification information of the image forming apparatus 101 and the job history list (2) described above via the communication unit 303. At this time, in the present embodiment, the job history control unit 304 also generates a list of the retired user account information and notifies the storage service 111 as information of retired users. After the processing in step S809, the job history control unit 304 terminates the processing of the flowchart.

The present embodiment shows a configuration that the setting values of the image forming apparatus 101 are set in the storage service 111 and the image forming apparatus 101 obtains and sets the setting values. The setting values may be set directly in the image forming apparatus 101. In this configuration, the image forming apparatus 101 shall perform the processing of steps S804 to S809 if the user newly adds retired users.

FIG. 9 illustrates a flowchart showing notification processing of the job history list of the retired users when the storage service 111 receives the job history list (2) from the image forming apparatus 101. The flow is executed in response to the notification in step S809 shown in FIG. 8.

In step S901, if the communication unit 403 obtains (receives) the individual identification information (information identifying the individual, such as the serial number) of the image forming apparatus 101 from the communication unit 303 of the image forming apparatus 101, the process proceeds to step S902. In step S902, the communication unit 403 confirms, via the device management unit 402, whether or not the individual identification information received in step S901 is included in the individual identification information of the managed (registered) image forming apparatuses. This process is similar to step S602 in FIG. 6, so a detailed description is omitted. If the image forming apparatus 101 is registered (YES in step S902), the communication unit 403 advances the process to step S903. On the other hand, if the image forming apparatus 101 is not registered (NO in step S902), the communication unit 403 terminates the processing of the flowchart.

In step S903, the communication unit 403 receives the list of retired user accounts and a job history list (2) as information of the retired users from the image forming apparatus 101. The received information of the retired users and the job history list (2) are temporarily stored in the storage device 204 or the RAM 203, and the received information is passed to the job history management unit 404. In response to the passing, the job history management unit 404 executes the processing of step S904.

In step S904, the job history management unit 404 extracts job histories executed by the retired user corresponding to the user name from the job history list (1) based on the information of the retired users received in step S903 to generate a job history list (3).

An example of the job history list (3) is shown in Table 4. The job history list (3) is extracted from the job history list (1) shown in Table 1 with the user name "userB" (corresponding to the job history listed in the third line in Table 1).

TABLE 4

| Serial No. | Job type | User name | Document name | Keywords | Destination |
|---|---|---|---|---|---|
| 34567 | copy | userB | 20200525104523 | specification confidential | http://storage.com/data/3 |

In step S905, the job history management unit 404 transmits email notification attaching the job history list (2) and job history list (3) shown in Tables 3 and 4 via the communication unit 403. The email notification destination to be transmitted is the email address specified in the email notification destination address in the email settings 706 shown in FIG. 7A. After the processing in step S905, the job history management unit 404 terminates the processing of the flowchart.

As a result of the above process, if a user retires, it is possible to monitor the job history performed by the retired user retrospectively. It is possible to reduce risks by limiting monitoring leaks.

In the present embodiment, the image forming apparatus 101 is configured to generate a job history list (2) and transmit the job history list (2) to the storage service 111 along with the list of the retired users. However, the image forming apparatus 101 may be configured to transmit the job histories executed by the retired users to the storage service 111 along with the list of the retired users. In this configuration, the storage service 111 shall generate a job history list (2) based on the received job histories and the list of the retired users. Further, the image forming apparatus 101 may notify the job history list (2) to the email notification address set in the storage service 111 and/or the email settings 706 in step S809 shown in FIG. 9.

FIG. 10 illustrates a flowchart showing the process by which the setting management unit 401 of the storage service 111 periodically confirms the settings stored in the storage device 204 and automatically deletes any user account that has expired for monitoring. This flow may be executed, for example, when the setting management unit 401 detects a date change. The changed setting values are periodically obtained by the image forming apparatus 101 in step S801 shown in FIG. 8.

In step S1001, the setting management unit 401 obtains the setting values stored in the storage device 204 and stores the setting values in the RAM 203. The obtained setting values include the information of the retired users 711 and the joined users 714 specified on the screen 710.

In step S1002, the setting management unit 401 confirms whether there are any unprocessed users in order to perform processing for each of the accounts of the retired users and the joined users obtained in step S1001. If there are still unprocessed users (YES in step S1002), the setting management unit 401 advances the process to step S1003.

In step S1003, the setting management unit 401 obtains information on the current date. In step S1004, the setting management unit 401 confirms whether the current date obtained in step S1003 has passed the monitoring expiration date set for the user to be processed. Specifically, in the case of the retired user indicated by "userA" shown in FIG. 7B, the monitoring expiration date is "Mar. 31, 2020". If the current date is on or after "Apr. 1, 2020", the setting management unit 401 determines that the monitoring expiration date has passed. If the monitoring expiration date has not passed (NO in step S1004), the setting management unit 401 advances the process to step S1002 to perform the processing for the next unprocessed user.

On the other hand, if the monitoring expiration date has passed (YES in step S1004), the setting management unit 401 advances the process to step S1005. In step S1005, the setting management unit 401 deletes the user information (the retired user or the joined user) of the user being processed from the setting value stored in the RAM 203 in step S1001. Here, the administrator may be notified that the user information has been deleted. After the processing in step S1005, the setting management unit 401 advances the processing to step S1002 to perform the processing for the next unprocessed user.

Then, if there are no unprocessed users (NO in step S1002), the setting management unit 401 advances the process to step S1006. In step S1006, the setting management unit 401 stores the setting value stored in the RAM 203 of the storage device 204 and terminates the processing of the flowchart.

In the present embodiment, the monitoring expiration date is specified for each monitoring user (the retired users and the joined users) but the monitoring start date may be specified. That is, a monitoring period (based on the monitoring start date and monitoring end date) may be specified for each monitoring user. In this configuration, the storage service 111 and the image forming apparatus 101 exclude one or more the job histories of users before the monitoring start date from monitoring.

The present embodiment shows a configuration in which the setting values of the image forming apparatus 101 are set in the storage service 111 and the image forming apparatus 101 obtains and sets the setting values. However, the setting values may be set directly in the image forming apparatus 101. In this configuration, the image forming apparatus 101 shall perform the same processing as shown in FIG. 10. Further, if the monitoring start date is specified as described above, the image forming apparatus 101 shall exclude the monitoring so that the one or more the job histories of users before the monitoring start date is excluded from the monitoring targets.

As a result of the above process, newly added user accounts are monitored. The user accounts targeted for monitoring are automatically excluded from monitoring after a predetermined period. This reduces the burden on administrators to reconfigure monitoring settings.

Second Embodiment

The first embodiment describes a configuration in which the image forming apparatus 101 has an OCR processing function and a keyword detection function. The second embodiment will describe the case where the storage service 111 has the OCR function and the keyword detection function. Only the difference between the first embodiment and the second embodiment will be described below.

Figure 11:
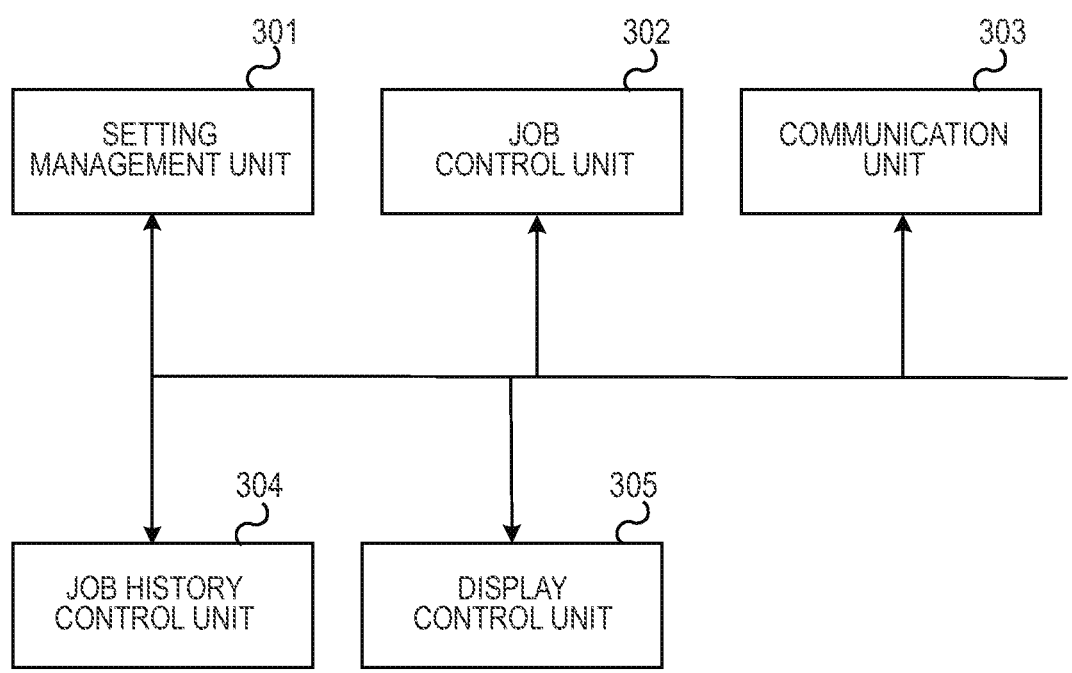
FIG. 11 illustrates a diagram showing a software configuration of the image forming apparatus according to the second embodiment.

FIG. 11 illustrates a diagram showing an example of the software configuration of the image forming apparatus 101 in the second embodiment. The same items as those shown in FIG. 3 are denoted by the same symbols and will not be described.

Figure 12:
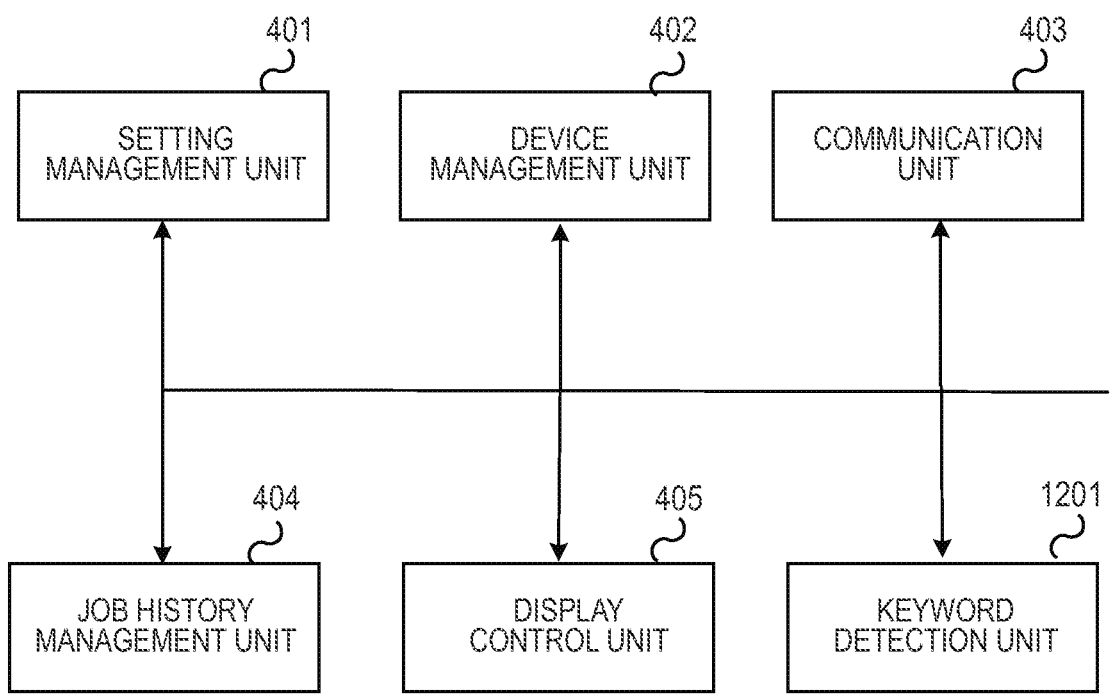
FIG. 12 illustrates a diagram illustrating a software configuration of the storage service according to the second embodiment.

FIG. 12 illustrates an example showing the software configuration of the storage service 111 in the second embodiment. The same items as those shown in FIG. 4 are denoted by the same symbols and will not be described. A keyword detection unit 1201 detects whether a specific keyword is included in the job history received and stored by the job history management unit 404 via the communication unit 403. Since it is similar to the keyword detection unit 306 shown in FIG. 3, a detailed description is omitted.

Figure 13:
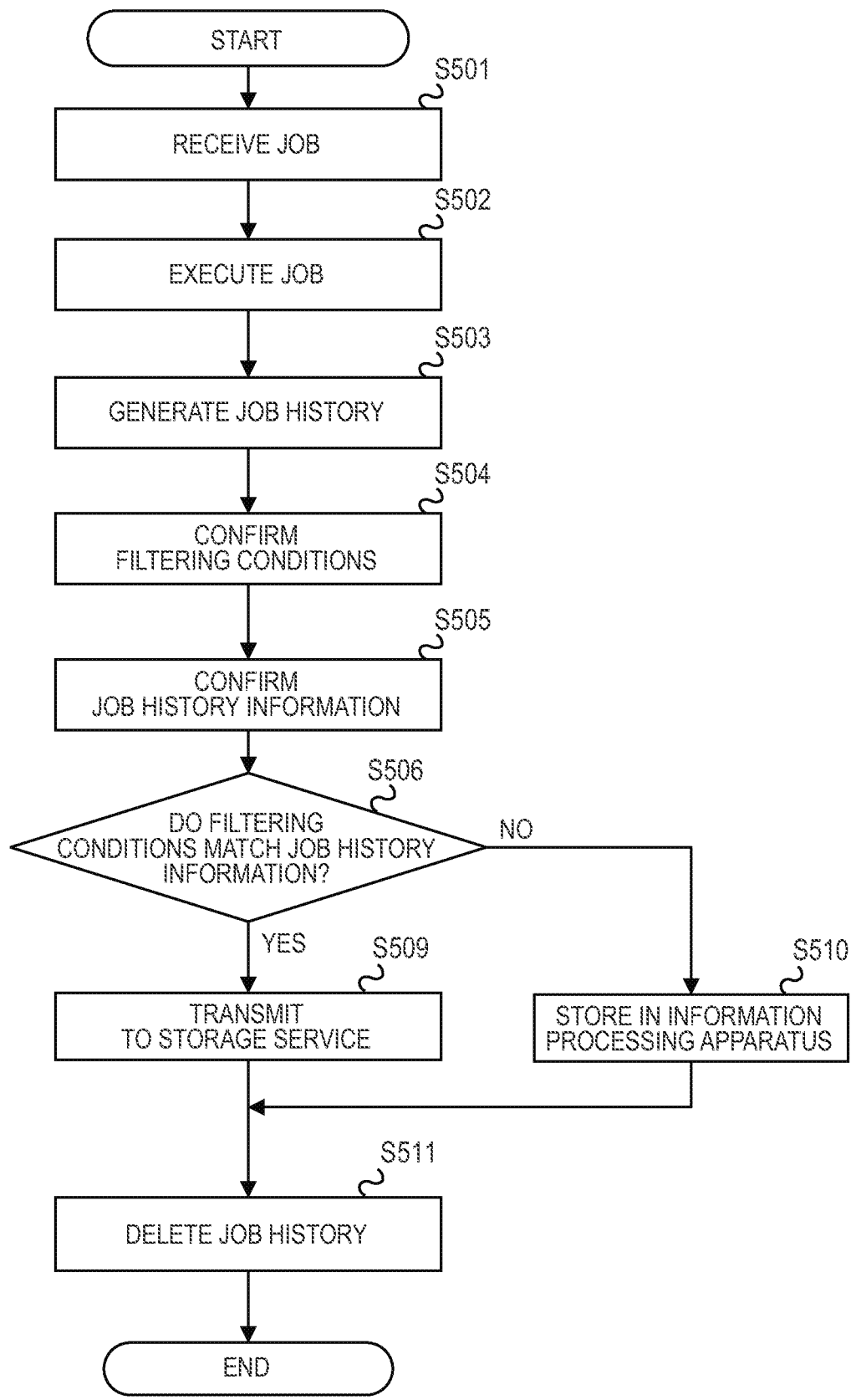
FIG. 13 illustrates a flowchart showing job execution process of the image forming apparatus according to the second embodiment.

FIG. 13 illustrates a flowchart showing an example of processing when the job control unit 302 of the image forming apparatus 101 executes a job in the second embodiment. The same steps shown in FIG. 5 are assigned the same step numbers. In the present embodiment, however, if the filtering conditions are met (YES in step S506), the job history control unit 304 advances the process to step S509. Further, since the image forming apparatus 101 does not have the OCR processing function or the keyword detection function in the present embodiment, the image forming apparatus 101 does not transmit keywords and the OCR character information in steps S509 and S510, but only transmits the job history.

Figure 14:
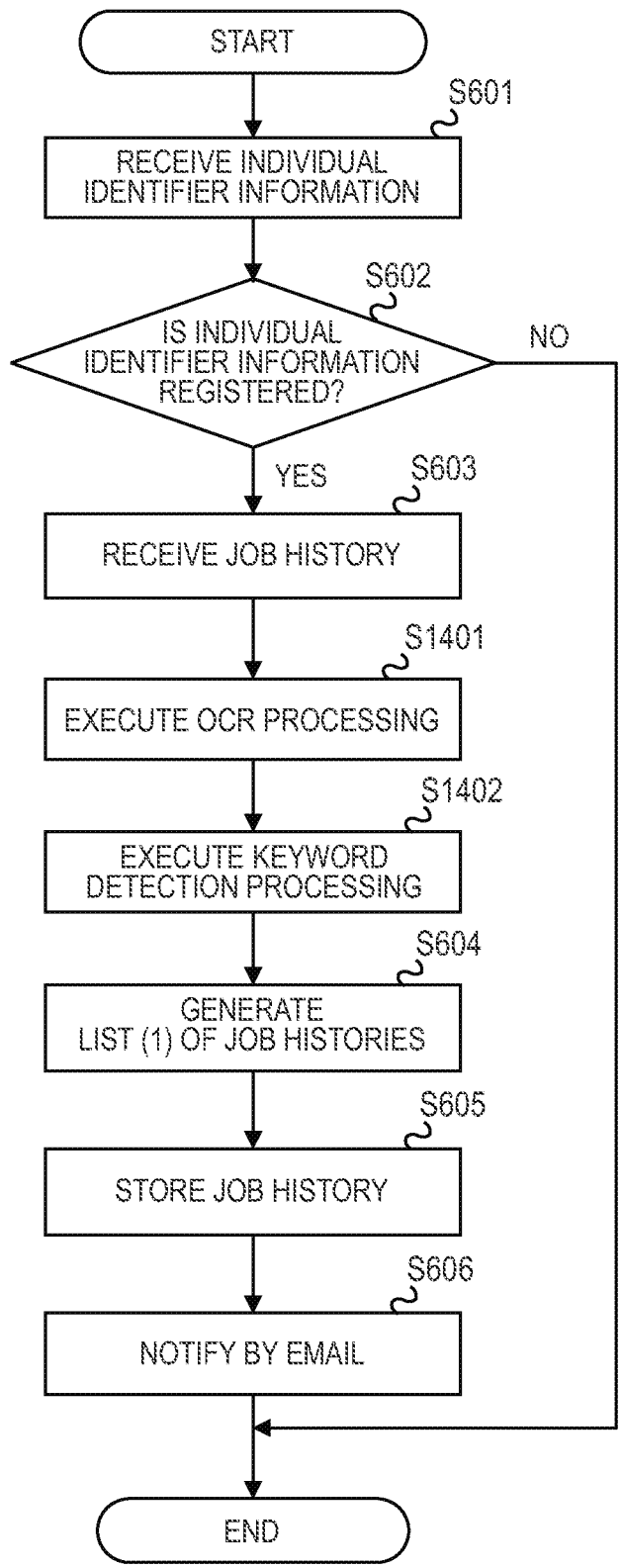
FIG. 14 illustrates a flowchart showing job history receiving process of the storage service according to the second embodiment.

FIG. 14 illustrates a flowchart showing an example of processing in which the storage service 111 in the second embodiment receives the job history transmitted in response to the job execution in the image forming apparatus 101 shown in FIG. 13. This processing is executed according to the transmission processing in step S507 shown in FIG. 13. In the flowchart, the same steps as those shown in FIG. 5 are assigned the same step numbers. Since the flowchart is a flowchart in which steps S1401 and S1402 are added to the flowchart shown in FIG. 6, descriptions for the processes of steps other than the additional steps are omitted.

In the present embodiment, however, in step S603, the job history management unit 404 executes the processing in step S1401 in response to the reception of the job history by the communication unit 403. In step S1401, the job history management unit 404 performs the OCR processing on the job history image data received from the image forming apparatus 101 in step S603 and stored in the storage device 204 or RAM 203. The OCR processing is performed by the keyword detection unit 1201 at the request of the keyword detection unit 1201 by the job history management unit 404, and the obtained OCR character information is stored in the RAM 203.

In step S1402, the keyword detection unit 1201 performs the keyword detection processing on the OCR character information stored in step S1401. Here, the keyword determined to be included in the OCR character information is used as the value of the "keyword" column in the job history list (1) generated in step S604. Then, in step S604, the job history management unit 404 generates the job history list (1). In this case, the keyword determined to be included in the OCR character information in step S1402 above is used as the value of the "keyword" column in the job history list (1) generated here.

Figure 15:
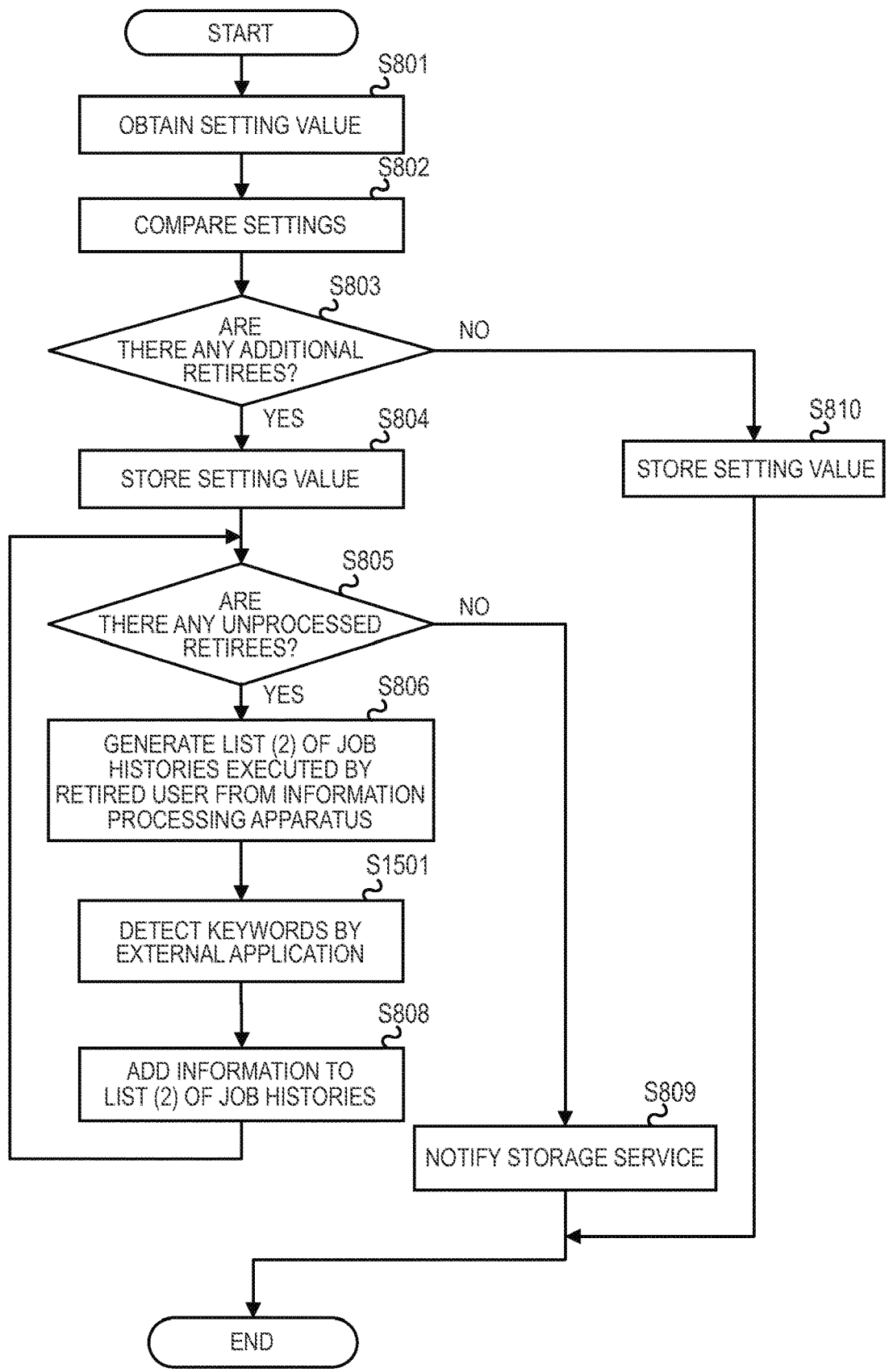
FIG. 15 illustrates a flowchart showing setting value obtaining process of the image forming apparatus according to the second embodiment.

FIG. 15 illustrates a flowchart showing an example of processing in which the job history control unit 304 of the image forming apparatus 101 in the second embodiment obtains the setting values from the setting management unit 401 of the storage service 111 via the communication unit 303. As shown in FIG. 8, it is assumed that the processing of the flowchart is executed by the job history control unit 304 at a predetermined period (e.g., once every five minutes). In the flowchart, the same steps as those shown in FIG. 8 are assigned the same step numbers. In the flowchart, step S807 in the flowchart shown in FIG. 8 is replaced by step S1501. That is, since the image forming apparatus 101 in the second embodiment does not have the OCR processing function and the keyword detection function, an external application or the like performs processing for the OCR processing function and the keyword detection function.

In step S1501, the job history control unit 304 calls a keyword detection application (not shown) via the communication unit 303 and instructs execution of keyword detection processing. For example, if the user specifies a storage path of image data and a list of keywords to be detected on the command line, the keyword detection application determines whether or not the specified keywords is included in the specified image data. As a result of the determination, if the specified keywords are included in the specified image data, the keyword detection application outputs a list of included keywords to the command line or file in response. If the specified keywords are not included in the specified image data, an error code or message indicating that the keywords are not included is output to the command line or file in response. The job history control unit 304 obtains the keyword detection result by the keyword detection application and the process proceeds to step S808.

According to the above embodiments, it is possible to achieve a balance between limiting the number of jobs to be monitored to reduce running costs and limiting risks by limiting monitoring omissions. In a job history monitoring system that stores monitoring targets in cloud storage for remote processing, it is possible to reduce running costs by filtering monitoring targets according to conditions and to expand monitoring targets later by storing not filtered data in intranet storage that is less expensive to operate. Thus, if a user retires, the entire job history performed by the retired user can be retrospectively monitored. Further, if a new user account is added, such as a new employee, the entire job history of the added user account is stored in cloud storage for a certain period from the addition of the user account so that the entire job history of the added user can be monitored. On the other hand, after a predetermined period, the administrator's task of reviewing the settings can be eliminated by automatically changing the settings to reduce operating costs by filtering the targets of monitoring according to conditions, just like other users.

The structure and contents of the various data described above are not limited to the above embodiments, and it goes without saying that the data consists of various structures and contents according to the use and purpose. Although one embodiment has been described above, the present disclosure can be implemented as a system, apparatus, method, program or storage medium, for example. Specifically, it may be applied to a system consisting of multiple devices, or it may be applied to an apparatus consisting of a single device. In addition, all of the configurations in which the above examples are combined are also included in the present disclosure.

According to the present disclosure, it is possible to reduce the running cost by filtering jobs to be monitored and risks by minimizing the monitoring omission.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-002229, filed Jan. 11, 2022, which is hereby incorporated by reference herein in its entirety.

What is claimed is:

1. A system, comprising image forming apparatuses, for providing a service managing information of a job performed by the image forming apparatuses,
the image forming apparatuses comprising:
one or more memories; and
one or more processors that execute instructions to:
generate the information of the job as a job history in response to performing the job;
set conditions including information of a user performing the job as conditions for the job to transmit the job history to the service;
first transmit a first job history that satisfies the conditions, from among a plurality of the job histories, to the service;
store a second job history that does not satisfy the conditions, from among the plurality of the job histories, in a predetermined storage medium; and
obtain a third job history corresponding to the job performed by the user among the plurality of the second job histories and second transmit information of the third job history to the service when the information of the user performing the job is added to the conditions,
wherein the service comprises:
one or more memories; and
one or more processors that execute instructions to:
manage the job history received from the image forming apparatuses;
first notify a predetermined notification destination based on the job history received from the image forming apparatuses; and
second notify the predetermined notification destination based on information of the job history received from the image forming apparatuses.

2. An image forming apparatus transmitting information to a service managing information of a job performed by one or more image forming apparatuses, the image forming apparatus comprising:
one or more memories; and
one or more processors that execute instructions to:
generate the information of the job as a job history in response to performing the job;
set conditions including information of a user performing the job as conditions for the job to transmit the job history to the service;
first transmit a first job history that satisfies the conditions, from among a plurality of the job histories, to the service;
store a second job history that does not satisfy the conditions, from among the plurality of the job histories, in a predetermined storage medium; and
obtain a third job history corresponding to the job performed by the user among the plurality of the second job histories and second transmit information of the third job history to the service or a predetermined notification destination when the information of the user performing the job is added to the conditions.

3. The image forming apparatus according to claim 2, wherein the one or more processors execute instructions to:
set monitoring period for the conditions associated with the information of the user performing the job; and
control the conditions so that the conditions do not include the information of the user performing the job outside the monitoring period.

4. The image forming apparatus according to claim 2, wherein the one or more processors execute instructions to:
generate the job history including documents used for the job as image data;
set keywords for the conditions;
obtain characters information from the image data included in the job histories by character recognition; and
detect the keywords from the characters information,
wherein the detected keywords are transmitted with the first job history to the service when the first job history satisfies the conditions,
wherein the detected keywords are transmitted with information of the third job history to the service when the information of the user performing the job is added to the conditions.

5. The image forming apparatus according to claim 2, wherein the storage medium is included in an information processing apparatus connected with the image forming apparatus via a LAN.

6. The image forming apparatus according to claim 2, wherein the storage medium is included in the image forming apparatus.

7. A method of controlling a system including image forming apparatuses and a service managing information of a job performed by the image forming apparatuses, the method comprising:
generating, by the image forming apparatuses, the information of the job as a job history in response to performing the job;
first transmitting, by the image forming apparatuses, a first job history that satisfies conditions including information of a user performing the job, from among a plurality of the generated job histories, to the service;

first storing, by the image forming apparatuses, a second job history that does not satisfy the conditions, from among the plurality of the generated job histories, in a predetermined storage medium; and obtaining, by the image forming apparatuses, a third job history corresponding to the job performed by the user among the plurality of the second job histories and second transmitting, by the image forming apparatuses, information of the third job history to the service when the information of the user performing the job is added to the conditions, second storing, by the service, the job history received from the image forming apparatuses in a storage medium;

first notifying, by the service, a predetermined notification destination based on the job history received from the image forming apparatuses; and first notifying, by the service, the predetermined notification destination based on information of the job history received from the image forming apparatuses.

8. A method of controlling an image forming apparatus transmitting information to a service managing information of a job performed by one or more image forming apparatuses, the method comprising:

generating the information of the job as a job history in response to performing the job;

first transmitting a first job history that satisfies conditions including information of a user performing the job, from among a plurality of the generated job histories, to the service;

storing a second job history that does not satisfy the conditions, from among the plurality of the generated job histories, in a predetermined storage medium; and obtaining a third job history corresponding to the job performed by the user among the plurality of the second job histories and second transmit information of the third job history to the service or a predetermined notification destination when the information of the user performing the job is added to the conditions.

9. A non-transitory computer-readable storage medium storing program to cause a computer to perform a method of controlling an image forming apparatus transmitting information to a service managing information of a job performed by one or more image forming apparatuses, the method comprising:

generating the information of the job as a job history in response to performing the job;

first transmitting a first job history that satisfies conditions including information of a user performing the job, from among a plurality of the generated job histories, to the service;

storing a second job history that does not satisfy the conditions, from among the plurality of the generated job histories, in a predetermined storage medium; and obtaining a third job history corresponding to the job performed by the user among the plurality of the second job histories and second transmit information of the third job history to the service or a predetermined notification destination when the information of the user performing the job is added to the conditions.

* * * * *